(12) United States Patent
Xu et al.

(10) Patent No.: US 11,804,884 B2
(45) Date of Patent: Oct. 31, 2023

(54) PRECODING PROCESSING METHOD AND APPARATUS (71) Applicant: HUAWEI TECHNOLOGIES CO., LTD., Guangdong (CN)

(72) Inventors: Heng Xu, Shanghai (CN); Jian Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/572,854

(22) Filed: Jan. 11, 2022

(65) Prior Publication Data
US 2022/0131579 A1 Apr. 28, 2022

Related U.S. Application Data (63) Continuation of application No. PCT/CN2020/101596, filed on Jul. 13, 2020.

(30) Foreign Application Priority Data

Jul. 12, 2019 (CN) .......................... 201910629025.0

(51) Int. Cl.
H04B 7/0456 (2017.01)
H04L 5/00 (2006.01)

(52) U.S. Cl.
CPC ......... H04B 7/0456 (2013.01); H04L 5/0048 (2013.01)

(58) Field of Classification Search
CPC .. H04B 7/0626; H04B 7/0456; H04B 7/0639; H04B 7/0632; H04B 7/0617;
(Continued)

(56) References Cited

U.S. PATENT DOCUMENTS 11,245,450 B2 * 2/2022 Na .................. H04B 7/0626
2012/0093089 A1 * 4/2012 Park .................. H04B 7/0626
370/328
(Continued)

FOREIGN PATENT DOCUMENTS

CN 101902298 A 12/2010
CN 102468947 A 5/2012
(Continued)

Primary Examiner — Eva Y Puente
(74) Attorney, Agent, or Firm — WOMBLE BOND DICKINSON (US) LLP (57) ABSTRACT This application discloses a precoding processing method and an apparatus. The method includes: A base station determines first downlink channel information based on a pilot signal received from a terminal device. The base station receives a precoding matrix indication PMI from the terminal device, determines second downlink channel information based on the PMI, determines a precoding matrix of a downlink channel based on the first downlink channel information and second downlink channel information, and performs precoding processing by using the precoding matrix. In this method, when calculating a downlink BF weight, the base station combines the downlink channel information obtained based on the pilot signal with the precoding matrix indicated by the PMI, to compensate for a quantization error caused by feedback of a single PMI indication. This method improves accuracy of beamforming weights.

17 Claims, 5 Drawing Sheets (58) Field of Classification Search
CPC ...... H04B 7/063; H04B 7/0417; H04B 7/024; H04W 72/042; H04W 24/10; H04W 72/0413; H04W 76/27; H04W 72/0446; H04W 72/046; H04W 72/04; H04W 88/02; H04J 11/0053; H04J 11/00; H04J 11/005; H04J 11/0056; H04J 11/0023; H04J 11/0079; H04J 2211/005; H04J 3/00
USPC .......................................................... 375/267
See application file for complete search history.

(56) References Cited

U.S. PATENT DOCUMENTS

| | | | | |
|---|---|---|---|---|
| 2014/0177745 | A1* | 6/2014 | Krishnamurthy | H04B 7/063 375/267 |
| 2016/0197657 | A1* | 7/2016 | Ko | H04L 5/001 370/329 |
| 2017/0026101 | A1 | 1/2017 | Kang et al. | |
| 2020/0322933 | A1* | 10/2020 | Zhang | H04W 72/042 |

FOREIGN PATENT DOCUMENTS

| | | |
|---|---|---|
| CN | 103701512 A | 4/2014 |
| CN | 104184537 A | 12/2014 |
| CN | 105589506 A | 5/2016 |
| CN | 106685502 A | 5/2017 |
| EP | 3200356 A1 | 8/2017 |
| EP | 3493438 A1 | 6/2019 |
| WO | 2015032038 A1 | 3/2015 |
| WO | 2017172333 A1 | 10/2017 |
| WO | 2018071094 A1 | 4/2018 |

* cited by examiner

PRECODING PROCESSING METHOD AND APPARATUS

CROSS-REFERENCE TO RELATED APPLICATIONS

This application is a continuation of International Application No. PCT/CN2020/101596, filed on Jul. 13, 2020, which claims priority to Chinese Patent Application No. 201910629025.0, filed on Jul. 12, 2019. The disclosures of the aforementioned applications are hereby incorporated by reference in their entireties.

TECHNICAL FIELD

This application relates to the beamforming field, and in particular, to a precoding processing method and an apparatus in a massive MIMO technology.

BACKGROUND

In a wireless communications system, with continuous improvement of a system capacity, system service diversity, and the like, a massive multiple input multiple output (MIMO), a Massive MIMO technology for short, has become a key technology in the wireless communication field. The MIMO technology means that a transmit end and a receive end separately use a plurality of transmitter (T) antennas and receiver (R) antennas (for example, 4T4R), so that a signal is transmitted and received by using the plurality of antennas at the transmit end and the receive end, to improve communication quality. In the technology, spatial resources can be fully used, and multiple-output multiple-input is implemented by using the plurality of antennas, so that a system channel capacity can be exponentially increased without consuming more spectrum resources and antenna transmit power.

The massive MIMO technology means that large-scale antenna arrays are deployed in a coverage area of a base station (where a total quantity of antennas corresponding to the antenna arrays may reach tens or even hundreds) and placed in a centralized manner, and simultaneously serve a plurality of user equipment (UE) distributed in the coverage area of the base station. On a same time-frequency resource, spatial freedom of a vertical dimension and a horizontal dimension that are provided by the large-scale antenna configuration for the base station improves a multi-user spatial multiplexing capability, a beamforming capability, and an interference suppression capability, and greatly improves overall utilization of spectrum resources of the system.

A key to the massive MIMO technology is precise beamforming (BF). The beamforming is usually also referred to as precoding. By adjusting an amplitude and a phase of a transceiver unit of each antenna, transmit/receive signals of an antenna array in a specific direction are coherently superimposed, while signals in other directions counteract each other. The precise beamforming depends on real-time and accurate channel estimation results. If complete channel information can be obtained, a transmit/receive weight can be obtained by using a beamforming algorithm, where the weight is an amplitude adjustment amount and a phase adjustment amount of each antenna transceiver unit.

A common beamforming solution is a codebook-based precoding technology. In a codebook-based precoding method, a precoding matrix is obtained by user equipment (UE) at a receive end, and the UE uses predicted downlink channel state information (CSI) to select a precoding matrix from a predetermined precoding codebook, and sends a sequence number of the selected precoding matrix, for example, a precoding matrix indication (PMI), to the base station, to reduce overheads.

When selecting the precoding matrix from the predetermined precoding codebook, the UE may select the precoding matrix according to a quantization-based selection manner. That is, the channel information is corresponding to the predetermined precoding codebook, or a precoding codebook closest to the CSI is selected. A large quantization error exists in a selection process, and the selected PMI often cannot completely and accurately represent the channel information. As a result, after the base station at the receive end receives the PMI fed back by the UE, a large quantization error exists between the precoding matrix indicated by the PMI and actual channel information, resulting in a large error in a weight corresponding to the precoding matrix. Consequently, a beam direction is inaccurate during BF, and system performance is affected.

SUMMARY

This application provides a precoding processing method and an apparatus, to reduce a quantization error, thereby improving a beamforming BF weight. Specifically, this application discloses the following technical solutions.

According to a first aspect, an embodiment of this application provides a precoding processing method, and the method may be performed by a base station or a chip in the base station (where the base station and the chip in the base station may be collectively referred to as a communication apparatus). An example in which the base station performs the method is used for description below. The method includes: The base station receives a pilot signal from a terminal device, and determines first downlink channel information based on the pilot signal received from the terminal device. The base station receives a PMI from the terminal device, and determines second downlink channel information based on the PMI. The base station determines a precoding matrix of a downlink channel based on the first downlink channel information and the second downlink channel information. The base station performs precoding processing by using the precoding matrix.

In an embodiment, the terminal device is a non-antenna-selection terminal.

In this aspect, when calculating a downlink BF weight, the base station combines a part of downlink channel information obtained based on the pilot signal with the precoding matrix indicated by the PMI, to compensate for a quantization error caused by feedback of a single PMI indication. This method improves accuracy of the beamforming weight.

In an embodiment, before the base station receives the PMI, the base station determines, based on the first downlink channel information, a port used to send a reference signal, and sends the reference signal through the port, where the reference signal is used to determine the PMI for the terminal device.

Further, the determining a port includes: determining a quantity of ports used to send the reference signal and a specific port number, where the port number may be determined by using a weight value of each port.

In an embodiment, the reference signal is a channel state information reference signal (CSI-RS).

In an embodiment, in determining the precoding matrix of the downlink channel based on the first downlink channel information and the second downlink channel information, the base station determines a first covariance matrix based on the first downlink channel information; determines a second covariance matrix based on the second downlink channel information; obtains a third covariance matrix based on the first covariance matrix and the second covariance matrix, and performs singular value decomposition SVD on the third covariance matrix to obtain a first characteristic matrix; and determines the precoding matrix of the downlink channel based on the first characteristic matrix and a quantity of downlink transmitted streams.

In an embodiment, the first covariance matrix is represented as $H_{SRS}{}^H H_{SRS}$, the second covariance matrix is represented as $H_{PMI}{}^H H_{PMI}$, and the third covariance matrix is represented as $R_{HH}$, where the third covariance matrix, the first covariance matrix, and the second covariance matrix satisfy:

$$R_{HH} = \alpha H_{SRS}{}^H H_{SRS} + \beta H_{PMI}{}^H H_{PMI},$$

where $\alpha$ and $\beta$ represent channel estimation confidence, $H_{SRS}$ represents the first downlink channel information, $H_{SRS}{}^H$ is a matrix obtained through conjugate transposition of $H_{SRS}$, $H_{PMI}$ represents the second downlink channel information, $H_{PMI}{}^H$ is a matrix obtained through conjugate transposition of $H_{PMI}$, the first characteristic matrix is represented as $(U)_{n \times n}$, the precoding matrix is a matrix obtained after m streams are selected from the first characteristic matrix $(U)_{n \times n}$, is the quantity of downlink transmitted streams, and $m \leq n$.

In an embodiment, in determining the precoding matrix of the downlink channel based on the first downlink channel information and the second downlink channel information, the base station obtains third downlink channel information based on the first downlink channel information and the second downlink channel information; performs SVD decomposition on the third downlink channel information to obtain a second characteristic matrix; and obtains the precoding matrix of the downlink channel after extracting m columns from the second characteristic matrix, where m is a quantity of downlink transmitted streams.

In an embodiment, the PMI is a precoding matrix obtained after the terminal device performs channel estimation on a CSI RS received by using a target port; and the target port is all remaining ports in all ports of the terminal device except the port used to send the pilot signal.

In an embodiment, the first downlink channel information is downlink channel information obtained after the terminal device performs channel estimation on the CSI RS received by using the target port.

According to a second aspect, an embodiment of this application further provides a communication apparatus. The apparatus is configured to implement the precoding processing method according to the first aspect and various implementations of the first aspect. The apparatus may be a base station, or an apparatus integrated in the base station, for example, a chip of the base station.

According to a third aspect, an embodiment of this application further provides a communication apparatus, which may be a base station or a chip in the base station, including a processor. The processor is coupled to the memory, and the memory is configured to store instructions. The processor is configured to invoke the instructions to enable the communication apparatus to perform the precoding processing method according to the first aspect and various implementations of the first aspect. Optionally, the communication apparatus further includes the memory.

In an embodiment, when the communication apparatus is a base station, the communication apparatus further includes a transceiver, configured to receive or send a message, data, and the like from a terminal device.

In an embodiment, when the communication apparatus is a chip in a base station, the communication apparatus further includes an interface circuit, configured to communicate with a component or a unit other than the chip.

In an embodiment, the communication apparatus may be the apparatus according to the second aspect.

According to a fourth aspect, an embodiment of this application further provides a computer-readable storage medium. The storage medium stores instructions. When the instructions are run on a computer or a processor, the method according to the foregoing first aspect and various implementations of the first aspect is performed.

In addition, this embodiment further provides a computer program product. The computer program product includes computer instructions. When the instructions are executed by a computer or a processor, the method according to the foregoing first aspect and various implementations of the first aspect may be implemented.

According to a fifth aspect, an embodiment of this application further provides a chip system. The chip system includes a processor and an interface circuit. The interface circuit is coupled to the processor. The processor is configured to execute a computer program or instructions, to implement the method according to the foregoing first aspect or various implementations of the first aspect. The interface circuit is configured to communicate with another module other than the chip system.

According to a sixth aspect, an embodiment further provides a wireless communication system. The system includes a base station and a terminal device. The terminal device is configured to send a pilot signal SRS and a PMI to the base station. The base station is configured to: receive the SRS and PMI, and determine first downlink channel information by using the SRS; determine second downlink channel information based on the PMI; and determine a precoding matrix of a downlink channel based on the first downlink channel information and the second downlink channel information, and perform precoding processing by using the precoding matrix.

According to the method provided in this embodiment, the base station determines, by using the pilot signal, uplink channel information that is sent by a terminal device by using some antennas and downlink channel information corresponding to the uplink channel information; obtains another part of downlink channel information by using the PMI, finally combines the two parts of downlink channel information to obtain the precoding matrix, and performs precoding processing by using the precoding matrix. Because the precoding matrix includes the downlink channel information estimated based on the pilot signal and the channel information estimated based on the PMI feedback, a quantization error generated solely by the PMI feedback is compensated, and accuracy of the beamforming weight is improved in this method.

DESCRIPTION OF EMBODIMENTS

To enable a person skilled in the art to better understand technical solutions in embodiments of this application, and make objectives, features, and advantages of the embodiments of this application clearer, the following further describes the technical solutions in the embodiments of this application in detail with reference to the accompanying drawings.

Before the technical solutions in the embodiments of this application are described, an application scenario of the embodiments of this application is first described with reference to the accompanying drawings.

The technical solutions of this application may be applied to a communication system including at least one network device and at least one terminal device, for example, a long term evolution (LTE) system or a 5th generation (5G) mobile communication system. In addition, the technical solutions may be further applied to a subsequent communication system, for example, a sixth generation mobile communication system and a seventh generation mobile communication system. Further, the system may be used for beamforming (BF) and beam management (BM).

A communication system includes a network device and at least one terminal device. The network device may be a base station (BS). For example, the base station may be an evolved NodeB (eNB/e-NodeB) in LTE, an eNB (next generation eNB, ng-eNB) in next generation LTE, a gNB in NR, a base station in a future mobile communication system, an access node in a wireless fidelity (Wi-Fi) system, or the like. A specific technology and a specific device form used by the network device are not limited in the embodiments of this application. In this application, the network device may be a radio access network device.

The terminal device in the embodiments of this application may be a device that provides service and/or data connectivity to a user, a handheld device with a wireless connection function, or another processing device connected to a wireless modem, for example, a wireless terminal. Further, the wireless terminal may communicate with one or more nodes over a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges a language and/or data with the radio access network. For example, the terminal device may be a device such as a personal communications service (PCS) phone, a cordless telephone set, a session initiation protocol (SIP) phone, a wireless local loop (WLL) station, or a personal digital assistant (PDA). The wireless terminal may also be a subscriber unit, a subscriber station, a mobile station, a remote station (remote station), an access point (AP), a remote terminal, an access terminal, a user terminal, a user agent, a user device, or a user equipment (UE). A specific technology and a specific device form used by the terminal device are not limited in the embodiments of this application.

Figure 1:
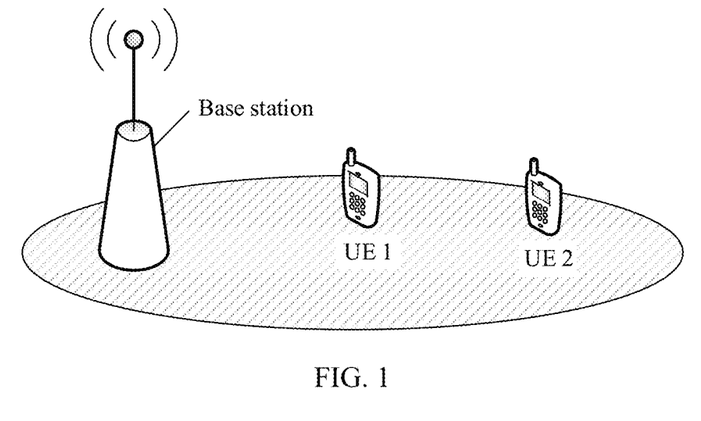
FIG. 1 is a schematic diagram of a scenario of a communication system according to an embodiment of this application.

For example, refer to a communication system shown in FIG. 1. The communication system includes a base station and two UEs, UE 1 and UE 2, within a coverage area of the base station. In this embodiment, data transmission between the base station and the UE 1 is used as an example to describe the technical solution of this application.

The technical solution of this application is outlined as follows. The base station determines downlink channel information by using an uplink pilot signal, determines, based on the downlink channel information, a port used to send a downlink channel state information reference signal (CSI RS), and receives a PMI that is selected and fed back by the UE by using a predetermined precoding codebook. During downlink BF weighting, the base station combines the downlink channel information corresponding to the pilot signal with downlink channel information fed back by the PMI, to obtain a weight with higher precision, and uses the weight to perform accurate BF weighting. Therefore, a large error generated in a quantization process is compensated.

Figure 2:
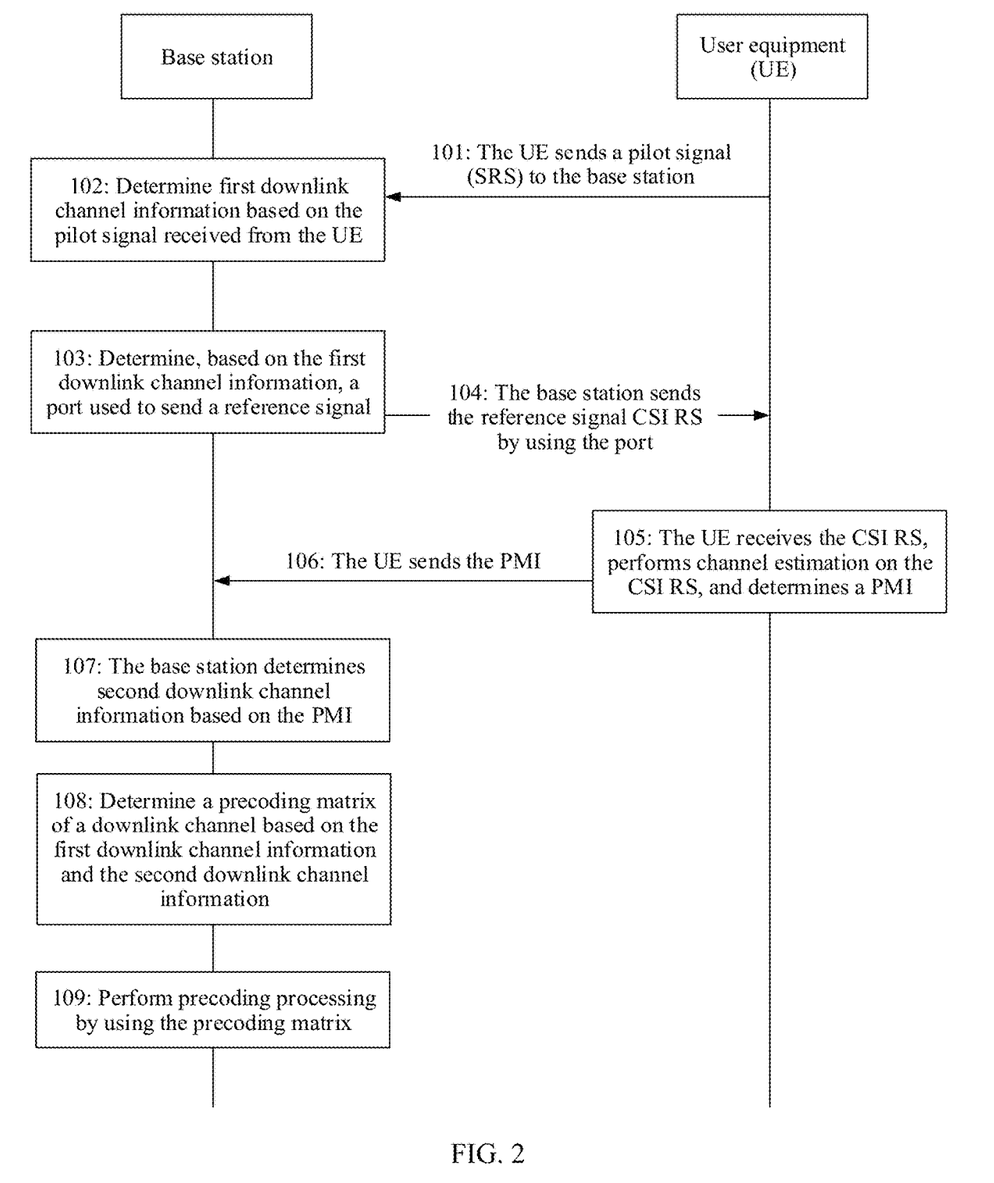
FIG. 2 is a flowchart of a precoding processing method according to an embodiment of this application.

In an embodiment, as shown in FIG. 2, a method includes the following operations.

101: UE sends a pilot signal to a base station. Correspondingly, the base station receives the pilot signal from the UE, where the pilot signal is used to detect an uplink channel. A quantity of antennas used by the UE to send the pilot signal is less than a quantity of antennas used to receive a signal.

In an embodiment, the pilot signal is a sounding reference signal (sounding reference signal, SRS).

The UE is a non-antenna-selection terminal, and the non-antenna-selection terminal means that a quantity of antennas used by the UE to send an uplink pilot signal is fixed, and the quantity of antennas used for uplink transmission is less than a quantity of antennas used for downlink reception. For example, for 2T4R UE (two transmitter antennas and four receiver antennas), the non-antenna-selection terminal means that the UE uses only two fixed antennas to transmit an SRS during uplink transmission and uses four antennas to receive a signal during downlink transmission. Correspondingly, an antenna-selection terminal means that a quantity of antennas used by the UE to send an uplink pilot signal and port numbers of the antennas are not fixed, and a specific quantity of antennas and antenna numbers of these antennas may be set by using a system. For example, it is set that the UE sends the SRS by using two antennas each time, but antenna numbers of antennas selected to send the pilot signal may be different each time. For example, at a specific moment, the UE sends the SRS by using antennas 0 and 1, and at a next moment, the UE sends the SRS by using antennas 2 and 3. Therefore, after the SRS is sent twice, a base station at a receive end obtains the SRS transmitted by the four antennas traversing antenna numbers 0 to 3, to obtain complete downlink channel information. However, for the non-antenna-selection terminal, because a same antenna is used to send the SRS at each moment, the base station cannot obtain the complete downlink channel information.

102: The base station determines first downlink channel information based on the pilot signal received from the UE.

The base station includes N transmitter antennas and N receiver antennas, N≥1, and N is a positive integer.

Operation 102 includes: the base station obtains first uplink channel information by using the pilot signal SRS received by the N receiver antennas, where the first uplink channel information is uplink channel state information (CSI). In a time division duplex (TDD) system, the base station estimates the first uplink channel information CSI by using channel reciprocity to obtain the first downlink channel information CSI, where the first downlink channel information CSI corresponds to antenna domain vectors of N beams. The reciprocity means that an uplink channel and a downlink channel are reciprocal. Therefore, after the base station obtains the first uplink CSI, the first uplink CSI may be represented by using a spatial channel matrix, and the spatial channel matrix is transposed to obtain the first downlink CSI.

In an embodiment, the first downlink channel information (or the first downlink CSI) may be represented by using a matrix $H_{SRS}$. In addition, because the first downlink channel information is determined by the base station based on the SRS directly sent by the UE, and is neither selected from a codebook nor indicated by a PMI, there is no quantization loss and no quantization error.

103: The base station determines, based on the first downlink channel information, a port used to send a reference signal.

The reference signal is a channel state information reference signal (CSI RS). The determining a port used to send a reference signal includes: determining a quantity of ports used to the CSI RS and port numbers, where the port number may be represented by using a weight corresponding to each port. Each weight corresponds to one beam, and each beam is sent by using one port.

In an embodiment, the base station first determines a quantity of effective beams based on a reference signal received power (reference signal received power, RSRP) value of each beam when the base station receives the SRS, and determines the quantity of ports and the port numbers based on the quantity of effective beams, where the quantity of ports is the same as the quantity of effective beams.

104: The base station sends the reference signal CSI RS by using the port.

In an embodiment, the base station sends the CSI RS by using preset power of each port, where the preset power of each port may be the same or different, or transmit power is determined based on the CSI RS of each port.

105: The UE receives the CSI RS, and performs channel estimation on the CSI RS, to determine a PMI.

In an embodiment, the UE receives a downlink CSI RS by using at least one port, and performs channel estimation on the downlink CSI RS received by the at least one port to obtain the downlink CSI (first downlink channel information). The UE selects, based on a precoding codebook specified in a protocol (where the precoding codebook includes a correspondence between CSI and a precoding matrix sequence number), a precoding matrix that best matches the CSI, to determine a precoding matrix indication PMI corresponding to the precoding matrix.

In another embodiment, when performing channel estimation on the CSI RS received by some ports, and determining a precoding matrix, the UE receives the CSI RS by using all ports, determines the CSI RS corresponding to at least one target port, and performs channel estimation on the CSI RS corresponding to the target port, to obtain a matched precoding matrix, where the at least one target port is all remaining ports other than the port used to send the pilot signal (SRS) in all ports of the UE.

For example, for a non-antenna-selection terminal, the UE is a 2T4R terminal, where two antennas whose antenna port numbers are 0 and 1 are used to transmit the pilot signal SRS, and four antennas whose antenna port numbers are 0 to 3 are used to receive the downlink information CSI RS. In this case, after receiving, by using the four ports having port numbers 0 to 3, the CSI RS sent by the base station, the UE determines that the target ports are remaining ports having port numbers 2 and 3 other than the ports having port numbers 0 and 1, performs downlink channel estimation on the CSI RS received by the ports having port numbers 2 and 3, to determine the precoding matrix corresponding to the CSI RS, and sends the corresponding precoding matrix sequence number to the base station by using the PMI.

In this embodiment, the UE pre-negotiates with the base station about the port used to send the pilot signal SRS, and performs channel estimation on the CSI RS received by the remaining ports other than the pre-negotiated port. Therefore, compared with channel estimation performed by the UE on the CSI RS received by all ports of the UE, a calculation amount is reduced, and no error is generated for a subsequent processing result.

106: The UE sends the PMI to the base station. Correspondingly, the base station receives the PMI from the UE.

107: The base station determines second downlink channel information based on the PMI.

108: The base station determines a precoding matrix of a downlink channel based on the first downlink channel information and the second downlink channel information.

In an embodiment, the base station determines a first covariance matrix based on the first downlink channel information, determines a second covariance matrix based on the second downlink channel information, combines the first covariance matrix with the second covariance matrix to obtain a third covariance matrix, performs singular value decomposition (SVD) on the third covariance matrix to obtain a first characteristic matrix, and finally determines the precoding matrix of the downlink channel in the first characteristic matrix based on a quantity m of downlink transmitted streams.

The first covariance matrix is represented as $H_{SRS}{}^H H_{SRS}$, the second covariance matrix is represented as $H_{PMI}{}^H H_{PMI}$, the third covariance matrix is represented as $R_{HH}$, and the third covariance matrix, the first covariance matrix, and the second covariance matrix satisfy:

$$R_{HH} = f(H_{SRS}, H_{PMI}), \text{ and}$$

$$R_{HH} = f(H_{SRS}, H_{PMI}) = \alpha H_{SRS}{}^H H_{SRS} + \beta H_{PMI}{}^H H_{PMI},$$

where $\alpha$ and $\beta$ represent channel estimation confidence, $H_{SRS}$ represents the first downlink channel information, $H_{SRS}{}^H$ is a matrix obtained through conjugate transposition of $H_{SRS}$, $H_{PMI}$ represents the second downlink channel information, $H_{PMI}{}^H$ is a matrix obtained through conjugate transposition of $H_{PMI}$, the first characteristic matrix is represented as $(U)_{n \times n}$, the precoding matrix is a matrix obtained after m streams are selected from the first characteristic matrix $(U)_{n \times n}$, m is the quantity of downlink transmitted streams and $m \leq n$, n is a quantity of antennas of the base station, and optionally, n=64.

In an embodiment, the quantity m of downlink transmitted streams is a quantity of MIMO layers.

In an embodiment, the precoding matrix is, for example, a 64×64 matrix, and may be further represented by using the following expression:

$$(R_{HH})_{64 \times 64} = (U)_{64 \times 64} (\ominus)_{64 \times 64} (U^H)_{64 \times 64},$$

where $(U)_{64 \times 64}$ represents a 64×64 characteristic matrix, $(U^H)_{64 \times 64}$ is a transposed matrix of $(U)_{64 \times 64}$, the precoding matrix is a matrix obtained after m streams are selected from the characteristic matrix $(U)_{64\times64}$, and m may be determined based on a channel condition, for example, determined by using a layer 2 scheduling algorithm. When m=2, the precoding matrix is $(U)_{64\times2}$.

The confidence level $\alpha$ may be obtained by using a signal-to-noise ratio of uplink SRS channel estimation, a PMI quantization error, and the quantity of downlink transmitted streams. For example, factors such as the signal-to-noise ratio, the PMI quantization error, and the quantity of downlink streams are separately quantized, and quantization results are divided into different grade ranges. For example, quantization grade ranges obtained by dividing the three factors are respectively 3, 2, and 4. That is, the signal-to-noise ratio is divided into three ranges, the PMI quantization error is divided into two ranges, and the quantity of downlink streams is divided into four ranges. After the ranges are permuted and combined, there are 24 possibilities in total, and each possibility corresponds to a confidence value $\alpha$. The base station and the UE negotiate in advance. In addition, a confidence table is stored on the base station side. The table includes 24 possible combinations and a correspondence between each possible combination and the confidence value $\alpha$.

In addition, optionally, in another embodiment of operation 107, the base station first combines the first downlink channel information with the second downlink channel information to obtain third downlink channel information; then the base station performs SVD decomposition on the third downlink channel information to obtain a second characteristic matrix; and finally, the base station obtains the precoding matrix of the downlink channel after extracting partial information from the second characteristic matrix. The partial information includes m columns selected from the second characteristic matrix, and m is a quantity of downlink transmitted streams or a quantity of MIMO layers.

The third downlink channel information after the combination may be represented as:

$$H_{combine} = \begin{bmatrix} \alpha_1 H_{SRS} \\ \beta_1 H_{PMI} \end{bmatrix},$$

where $H_{combine}$ represents the third downlink channel information, $H_{SRS}$ represents the first downlink channel information, $H_{PMI}$ represents the second downlink channel information, $\alpha_1$ represents confidence of the first downlink channel information, and $\beta_1$ represents confidence of the second downlink channel information.

Further, an expression of the third covariance matrix $R_{HH}$ may be:

$$R_{HH} = f(H_{SRS} \cdot H_{PMI}) = H_{combine}^H H_{combine} = [\alpha_1 H_{SRS}^H \beta_1 H_{PMI}^H] \begin{bmatrix} \alpha_1 H_{SRS} \\ \beta_1 H_{PMI} \end{bmatrix} = \alpha_1^2 H_{SRS}^H H_{SRS} + \beta_1^2 H_{PMI}^H H_{PMI}.$$

It should be noted that in this embodiment, in a process in which the base station determines the precoding matrix of the downlink channel in operation 107, the combined second downlink channel information is a PMI fed back after the UE performs channel estimation on the downlink CSI RS received by all ports. For another possible implementation of the foregoing operation 105, a combination process in which the UE performs channel estimation by using the CSI RS received by using the target port (some ports) and feeds back the PMI is the same as the foregoing method in which the CSI RS estimation channel feedback PMIs received by all ports of the UE are combined to obtain the third covariance matrix $R_{HH}$ and the precoding matrix $(U)_{64\times2}$ and a process of feeding back the PMI to some ports of the UE and performing channel fusion to finally obtain the precoding matrix is not described again in this embodiment.

109: The base station performs precoding processing by using the precoding matrix.

In an embodiment, the base station performs precoding processing, for example, BF weighting, on to-be-sent data and a dedicated pilot based on the precoding matrix maps the to-be-sent data and the dedicated pilot to the transmitter antenna through BF weighting, and sends the data and the dedicated pilot that are obtained after the precoding processing to the UE. The UE receives the data and the dedicated pilot that are sent by the base station an obtained after the precoding processing. Further, the process of operation 109 is the same as a conventional technology, and details are not described in this embodiment.

According to the method provided in this embodiment, when calculating a downlink BF weight, a base station combines the downlink channel information obtained based on the pilot signal with the precoding matrix indicated by the PMI, to compensate for a quantization error caused by feedback of a single PMI indication. This method improves accuracy of beamforming weights.

Figure 3:
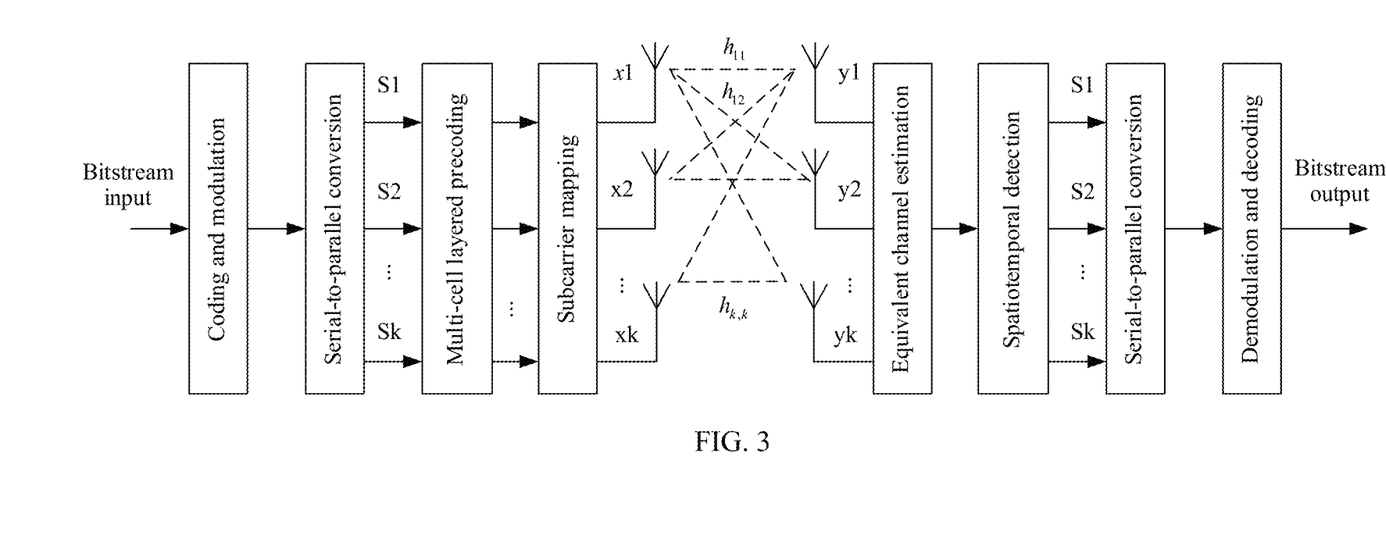
FIG. 3 is a block diagram of a multi-cell MIMO system based on hierarchical precoding according to an embodiment of this application.

In an embodiment, FIG. 3 is a schematic conceptual diagram of a MIMO system based on layered precoding. A basic structure of a transmitter is shown in the left part of FIG. 3. Each bit stream is independently encoded and modulated, and a modulated code word is sent to a layered precoding module, and is sent after modulation. A structure of a receiver is shown in the right part of FIG. 3, and a received signal of a user k is represented as:

$$y_k = [y_{k,1}, y_{k,2}, \ldots, y_{k,N_r}] = H_k f_k S_k + z_k,$$

where $N_r$ is a quantity of receiver antennas of the user, $f_k$ is a weight obtained after layered precoding processing is performed on the user, $H_k$ is a channel estimation result of the user k, $S_k = [S_{k,1}, S_{k,2}, \ldots, S_{k,L}]$ is L pieces of bit stream information sent to the user k, and $z_k$ is noise and interference.

In operation 102, this application provides a method for obtaining the downlink channel information by the base station in the following two cases (a) and (b):

(a) In a TDD system, by using channel reciprocity, an uplink channel of each user may be estimated on the base station side to obtain downlink channel information.

(b) In a frequency division duplex (FDD) system, the base station obtains, by using limited feedback, channel information status PMI fed back by each user.

In the case (a), a quantity of antennas used for receiving on the base station side and a quantity of antennas used for transmitting on the base station side are both N, N≥1, and N is a positive integer. The N receiver antennas are configured to receive a pilot signal sent by the UE. Data (antenna domain data) received by the N antennas is weighted by using a discrete fourier transformation (DFT) weighting method, to transform the antenna domain data into beam domain data (data obtained after beam weighting). In addition, the beam domain data corresponds to N beams. The DFT weighting method includes: weighting an N×N-dimensional DFT matrix. Generally, if N=64, the base station uses a 64×64 DFT matrix. Data obtained after any column (namely, a weight value) in the matrix is weighted is corresponding beam domain data. There are 64 weights in the DFT matrix in total, corresponding to 64 pieces of beam domain data.

For example, the base station receives the SRS by using 32 receiver antennas, and the UE transmits the SRS by using two transmitter antennas. In addition, a channel from an $i^{th}$ transmitter antenna on the UE side to a $j^{th}$ receiver antenna on the base station side is $h_{ji}$. If the $i^{th}$ transmitter antenna on the UE side sends a signal a, a signal received by the $i^{th}$ receiver antenna of the base station is b, and $b=h_{ji}*a$. Channel estimation values $h_{ji}$, of the foregoing transmitter and receiver antennas are combined into a matrix form H, which is represented as a channel matrix. In this embodiment, a dimension of an uplink channel H is 32*2, indicating 32 receiver antennas on the base station side and two transmitter antennas on the UE side. A value of $h_{ji}$ reflects a receiving capability of a port, and may be obtained through measurement. For example, an RSRP value of a beam received by the $j^{th}$ receiver antenna on the base station side is a sum of squares of $h_{j0}$ and $h_{j1}$.

In operations 102 and 103 of this embodiment, a DFT weight is used to perform transformation from an antenna domain to a beam domain, a quantity of pieces of antenna domain data is equal to a quantity of beams obtained through weighting, and a weighting vector is a row of a DFT matrix. Assuming that the quantity of antennas is N, the DFT matrix may be represented as $T_{N \times N}$, an antenna domain received signal vector is $x=[x_0, x_1, \ldots, x_{N-1}]^T$, and a transformed beam domain received vector is $y=[y_0, y_1, \ldots, y_{N-1}]^T$. In this case, a DFT weighting process is represented as:

$$y = T_{N \times N} \cdot x,$$

namely, $$\begin{bmatrix} y_0 \\ y_1 \\ \ldots \\ y_{N-1} \end{bmatrix} = \begin{bmatrix} e^{-j\frac{2\pi}{N}0,0}, e^{-j\frac{2\pi}{N}0,1}, \ldots, e^{-j\frac{2\pi}{N}0,(N-1)} \\ e^{-j\frac{2\pi}{N}1,0}, e^{-j\frac{2\pi}{N}1,1}, \ldots, e^{-j\frac{2\pi}{N}1,(N-1)} \\ \ldots \\ e^{-j\frac{2\pi}{N}(N-1),0}, e^{-j\frac{2\pi}{N}(N-1),1}, \ldots, e^{-j\frac{2\pi}{N}(N-1),(N-1)} \end{bmatrix} \cdot \begin{bmatrix} x_0 \\ x_1 \\ \ldots \\ x_{N-1} \end{bmatrix}.$$

In addition, in the foregoing operation 108, the base station obtains the third covariance matrix R based on the first covariance matrix and the second covariance matrix, and performs SVD decomposition on the third covariance matrix. The SVD is an algorithm widely used in the machine learning field, and the SVD may be applied to not only eigen-decomposition in a dimension reduction algorithm but also a recommendation system and fields such as natural language processing.

Assuming that a matrix A is an m×n matrix, SVD of the matrix A is defined as $A=U\Sigma V^T$.

U is an m×m matrix, is an m×n matrix, all elements except elements on a main diagonal are 0, each element on the main diagonal is referred to as a singular value, and V is an n×n matrix. Both U and V are unitary matrices, that is, $U^TU=1$, $V^TV=1$, and $V^T=U^H$ are satisfied.

Therefore, the matrix $A=U\Sigma V^T=U\Sigma U^H=R_{HH}$.

In an embodiment, A is a 64×64 matrix, and the precoding matrix is represented as:

$$(R_{HH})_{64\times 64}=(U)_{64\times 64}(\Sigma)_{64\times 64}(U^H)_{64\times 64},$$

where $(R_{HH})_{64\times 64}$ represents a second-order statistical characteristic of the channel, namely, a covariance matrix, U represents a characteristic direction of the channel, and may be understood as weighted weights arranged based on gain values, and $\Sigma$ represents a gain corresponding to the characteristic direction of the channel, namely, a gain of a corresponding beam (or each weighted weight). A combined precoding matrix is the first m columns of the matrix $(U)_{64\times 64}$, m represents a quantity of downlink streams or a quantity of downlink beams. Further, m may be determined based on a channel condition.

In an embodiment, m may alternatively be the last m column counted from back to front.

Figure 4:
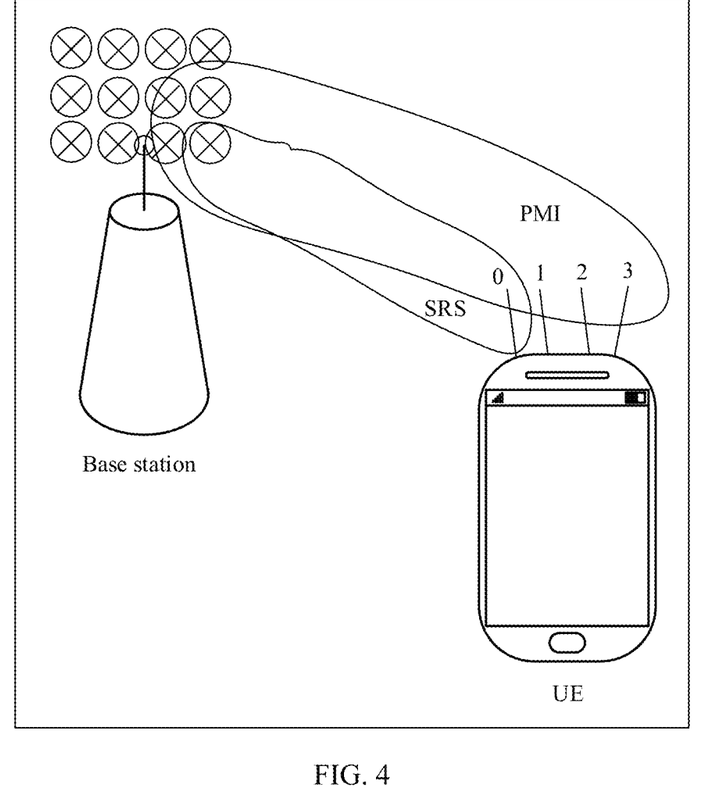
FIG. 4 is a schematic diagram of performing data stream transmission between a base station and UE according to an embodiment of this application.

As shown in FIG. 4, the UE includes four antennas with antenna numbers 0 to 3. The antenna 0 is used to transmit an uplink SRS, and the antennas 0 to 3 are all used to transmit a PMI. The base station receives the SRS and the PMI from the UE separately, and combines two pieces of information, first downlink channel information determined by the SRS and second downlink channel information indicated by the PMI, to obtain a precoding matrix of a downlink channel.

It may be understood that the first downlink channel information and the second downlink channel information may be combined to obtain the downlink channel precoding matrix in another manner. A specific combination manner is not limited in this application.

In an embodiment, when calculating a weight value of the downlink channel, the base station effectively combines the channel information obtained based on the SRS and the channel information obtained based on the PMI, to obtain a combined weight value. The weight value can obtain complete channel information. The weight precision of beamforming is improved, and a multi-stream weight problem of the non-antenna-selection terminal is effectively resolved.

In addition, in an embodiment, a downlink CSI RS transmission weight is obtained by using SRS information, and beamforming is also performed on CSI RS transmission, so that CSI RS signal received strength of a cell edge user is effectively improved, and a cell coverage area is effectively improved.

The following describes apparatus embodiments corresponding to the foregoing method embodiments.

Figure 5:
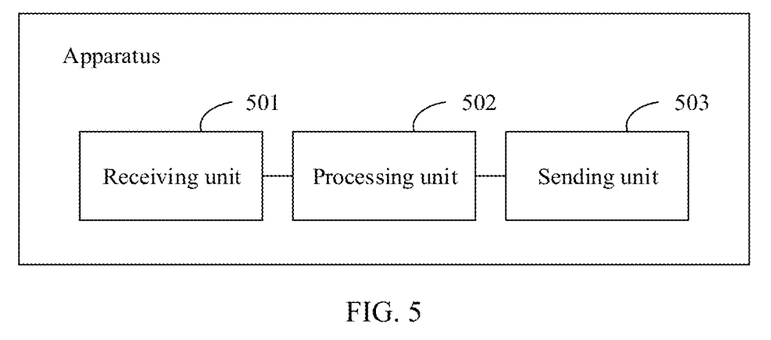
FIG. 5 is a schematic diagram of a structure of a communication apparatus according to an embodiment of this application.

FIG. 5 is a schematic diagram of a structure of a communication apparatus according to an embodiment of this application. The communication apparatus may be the base station or the terminal device in the foregoing method embodiments, or may be a chip located in the base station or the terminal device. Further, the apparatus may implement the precoding processing method in the foregoing embodiments.

Further, as shown in FIG. 5, the apparatus may include a receiving unit 501, a processing unit 502, and a sending unit 503. In addition, the apparatus may further include a storage unit or another unit or module.

In an embodiment, when the communication apparatus is used as a base station, the receiving unit 501 is configured to receive a pilot signal from a terminal device, and the processing unit 502 is configured to determine first downlink channel information based on the pilot signal. The receiving unit 501 is further configured to receive a precoding matrix indication PMI from the terminal device. The processing unit 502 is further configured to: determine second downlink channel information based on the PMI, determine a precoding matrix of a downlink channel based on the first downlink channel information and the second downlink channel information, and perform precoding processing by using the precoding matrix.

In an embodiment, the processing unit 502 is further configured to: before the PMI is received, determine, based on the first downlink channel information, a port used to send a reference signal, and the sending unit 503 is configured to send the reference signal by using the port. The reference signal is used to determine a precoding matrix that matches the first downlink channel information for the terminal device, and the precoding matrix is transmitted by using the PMI.

The reference signal is a CSI RS.

In another embodiment, the processing unit 502 is configured to: determine a first covariance matrix based on the first downlink channel information, and determine a second covariance matrix based on the second downlink channel information; obtain a third covariance matrix based on the first covariance matrix and the second covariance matrix, and perform singular value decomposition (SVD) on the third covariance matrix to obtain a first characteristic matrix; and determine a precoding matrix of the downlink channel based on the first characteristic matrix and a quantity of downlink transmitted streams.

In another embodiment, the first covariance matrix is represented as $H_{SRS}^H H_{SRS}$, the second covariance matrix is represented as $H_{PMI}^H H_{PMI}$, and the third covariance matrix is represented as $R_{HH}$, where the third covariance matrix, the first covariance matrix, and the second covariance matrix satisfy:

$$R_{HH} = \alpha H_{SRS}^H H_{SRS} + \beta H_{PMI}^H H_{PMI},$$

where $\alpha$ and $\beta$ represent channel estimation confidence, $H_{SRS}$ represents the first downlink channel information, $H_{SRS}^H$ is a matrix obtained through conjugate transposition of $H_{SRS}$, $H_{PMI}$ represents the second downlink channel information, $H_{PMI}^H$ is a matrix obtained through conjugate transposition of $H_{PMI}$, the first characteristic matrix is represented as $(U)_{n \times n}$, the precoding matrix is a matrix obtained after m streams are selected from the first characteristic matrix $(U)_{n \times n}$, m is the quantity of downlink transmitted streams, and $m \leq n$.

In another embodiment, the processing unit 502 is configured to: obtain third downlink channel information based on the first downlink channel information and the second downlink channel information, perform SVD decomposition on the third downlink channel information to obtain a second characteristic matrix, and obtain a precoding matrix of the downlink channel after extracting m columns from the second characteristic matrix, where m is the quantity of downlink transmitted streams.

In another embodiment, the PMI is a precoding matrix obtained after the terminal device performs channel estimation on the CSI RS received by using the target port. The target port is all remaining ports in all ports of the terminal device except the port used to send the pilot signal. The first downlink channel information is downlink channel information obtained after the terminal device performs channel estimation on the CSI RS received by using the target port.

Figure 6:
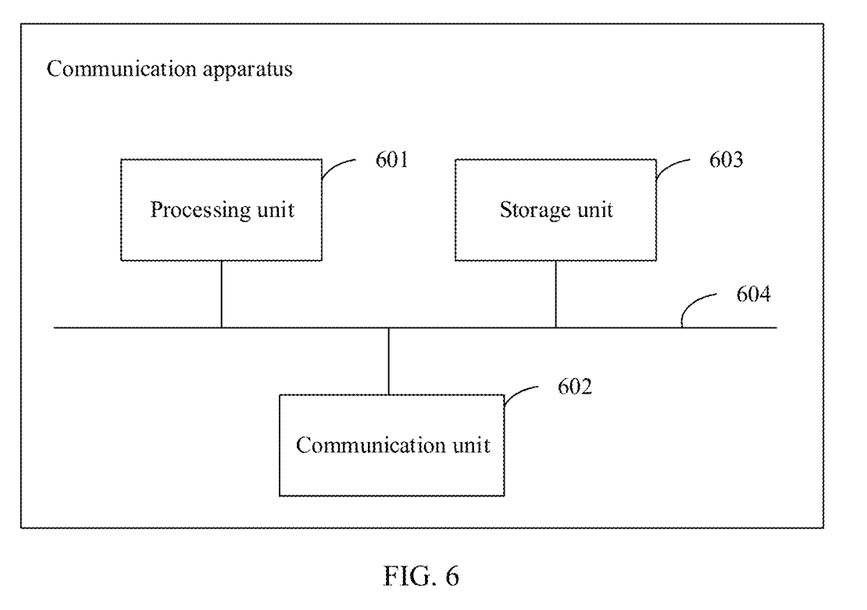
FIG. 6 is a schematic diagram of a structure of another communication apparatus according to an embodiment of this application.

In addition, an embodiment of this application further provides a communication apparatus. FIG. 6 is a schematic diagram of a structure of a communication apparatus according to an embodiment of this application. The communication apparatus may perform the method described in the foregoing method embodiments. For details, refer to the descriptions in the foregoing method embodiments. The communication apparatus may be used in a communication device, a circuit, a hardware component, or a chip. For example, the communication apparatus may be a terminal, a chip in the terminal, an access network device (a base station), or a chip in the access network device (the base station).

The communication apparatus includes a processing unit 601 and a communication unit 602. Optionally, the communication apparatus further includes a storage unit 603 and a communication bus 604.

The processing unit 601 may be an apparatus with a processing function, and may include one or more processors. The processor may be a general-purpose processor, a dedicated processor, or the like. The processor may be a baseband processor or a central processing unit. The baseband processor may be configured to process a communication protocol and communication data. The central processing unit may be configured to: control the apparatus (for example, a base station, a terminal, or a chip), execute a software program, and process data of the software program.

The communication unit 602 may be an apparatus for inputting (receiving) or outputting (sending) a signal, and is configured to perform signal transmission with another network device or another component in the device.

The storage unit 603 may be an apparatus with a storage function, and may include one or more memories.

In an embodiment, the processing unit 601, the communication unit 602, and the storage unit 603 are connected by using the communication bus 604.

In an embodiment, the storage unit 603 may exist independently, and is connected to the processing unit 601 by using the communication bus 604. The storage unit 603 may alternatively be integrated into the processing unit 601.

The communication apparatus may be the base station in the embodiments of this application. A schematic diagram of the base station may be shown in FIG. 5. In an embodiment, the communication unit 602 of the apparatus may include an antenna and a transceiver of the base station. The communication unit 602 may further include an output device, an input device, and the like.

In addition, the communication apparatus may be a chip in the base station in this embodiment of this application. The communication unit 602 may be an input or output interface, a pin, a circuit, or the like. The storage unit 603 may be a register, a cache, a RAM, or the like, and the storage unit 603 may be integrated into the processing unit 601. The storage unit 603 may be a ROM or another type of static storage device that can store static information and instructions. The storage unit 603 may be independent of the processing unit 601. In an embodiment, with development of wireless communication technologies, a transceiver may be integrated into the communication apparatus. For example, the communication unit 602 is integrated into the transceiver.

When the communication apparatus is a base station or a chip in the base station, the processing unit 601 may complete the method performed by the base station in the foregoing embodiments.

In an embodiment, the processing unit 601 may include instructions, and the instructions may be run on the processor, so that the communication apparatus performs the method of the base station in the foregoing embodiments.

In another embodiment, the storage unit 603 stores instructions, and the instructions may be run on the processing unit 601, so that the communication apparatus performs the method of the base station in the foregoing embodiments. Optionally, the storage unit 603 may further store data. Optionally, the processing unit 601 may also store instructions and/or data.

For example, the communication unit 602 receives a pilot signal from a terminal device, and processing unit 601 determines first downlink channel information based on the pilot signal. The communication unit 602 receives a PMI from the terminal device. The processing unit 601 determines second downlink channel information based on the PMI, determines a precoding matrix of a downlink channel based on the first downlink channel information and the second downlink channel information, and performs precoding processing by using the precoding matrix.

For others, refer to the method on the base station side in the foregoing embodiments, and details are not described herein again.

In addition, the communication apparatus may alternatively be a terminal device in this embodiment of this application, for example, UE. A schematic diagram of a structure of the terminal device may be shown in FIG. 6. Optionally, the terminal device includes a processing unit 601, a communication unit 602, a storage unit 603, a communication bus 604, and the like. Further, the communication unit 602 may include an antenna and a transceiver of the terminal device, and the communication unit 602 may further include at least one network interface or communication interface.

In an embodiment, the communication apparatus may alternatively be a chip in the terminal device in this embodiment of this application. The communication unit 602 may be an input or output interface, a pin, a circuit, or the like. The storage unit 603 may be a register, a cache, a RAM, or the like, and the storage unit 603 may be integrated into the processing unit 601. The storage unit 603 may be a ROM or another type of static storage device that can store static information and instructions. The storage unit 603 may be independent of the processing unit 601.

When the communication apparatus is a terminal device or a chip in the terminal device, the processing unit 601 may complete the method performed by the terminal device in the foregoing embodiments. For example, the communication apparatus sends a pilot signal to a base station, receives a CSI RS from the base station, determines the PMI based on the CSI RS, and sends the PMI to the base station.

In an embodiment, the processing unit 601 may include instructions, and the instructions may be run on the processor, so that the communication apparatus performs the method of the access network device in the foregoing embodiments.

In another embodiment, the storage unit 603 stores instructions, and the instructions may be run on the processing unit 601, so that the communication apparatus performs the method of the terminal device in the foregoing embodiments. Optionally, the storage unit 603 may further store data. Optionally, the processing unit 601 may also store instructions and/or data.

For others, refer to the method of the terminal device in the foregoing embodiments, and details are not described herein again.

The method flowcharts in the embodiments of this application are described above. It should be understood that the terminal device may have function units corresponding to operations of a method or a procedure of the terminal device, and the base station may have function units corresponding to operations of a method or a procedure of the base station. One or more of the foregoing modules or units may be implemented by using software, hardware, or a combination thereof. When any one of the foregoing modules or units is implemented by using software, the software exists in a form of a computer program instruction, and is stored in a memory. A processor may be configured to execute the program instruction to implement the foregoing method procedure.

The processor in this application may include but is not limited to at least one of the following computing devices that run various types of software: a central processing unit (CPU), a microprocessor, a digital signal processor (DSP), a microcontroller unit (MCU), an artificial intelligence processor, and the like. Each computing device may include one or more cores configured to execute software instructions to perform an operation or processing. The processor may be a single semiconductor chip, or may be integrated with another circuit into a semiconductor chip, for example, may be integrated with another circuit (such as a codec circuit, a hardware acceleration circuit, or various buses and interface circuits) to form a SoC (system on chip), or may be integrated into an ASIC as a built-in processor of the ASIC. The processor-integrated ASIC may be separately packaged or may be packaged together with another circuit. In addition to the core configured to execute the software instructions to perform the operation or processing, the processor may further include a necessary hardware accelerator, for example, a field programmable gate array (FPGA), a PLD (programmable logic device), or a logic circuit that implements a dedicated logic operation.

The memory in the embodiments of this application may include at least one of the following types: a read-only memory (ROM) or another type of static storage device that can store static information and instructions, a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or other compact disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but not limited thereto.

In addition to a data bus, the bus may further include a power bus, a control bus, a status signal bus, and the like. However, for clear description, various buses are marked as buses in the figures.

In an implementation process, operations in the foregoing methods may be implemented by using a hardware integrated logic circuit in the processor, or by using instructions in a form of software. The operations of the methods disclosed with reference to the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations of the foregoing methods in combination with the hardware of the processor. To avoid repetition, details are not described herein again.

According to the method in the embodiments of this application, an embodiment of this application further provides a system, including the foregoing apparatus and at least one network device.

It should be understood that, first, second, and various numerical symbols are for distinguishing only for ease of description, and are not used to limit a scope of the embodiments of this application.

It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

A person of ordinary skill in the art may be aware that, with reference to various illustrative logical blocks and operations described in the embodiments disclosed in this specification, functions may be implemented by using electronic hardware or a combination of computer software and electronic hardware. Whether the functions are performed by using hardware or software depends on a particular application and a design constraint condition of the technical solutions. A person skilled in the art may use different methods to implement the described functions for each particular application, but it should not be considered that the implementation goes beyond the scope of this application.

In the several embodiments provided in this application, it should be understood that the disclosed systems, apparatuses, and methods may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For same or similar parts in the embodiments in this specification, refer to each other. Especially, the embodiments related to the network device/node or apparatus device are basically similar to the method embodiments, and therefore are described briefly. For related parts, refer to the descriptions in the method embodiments.

The foregoing implementations of this application are not intended to limit the protection scope of this application.

What is claimed is:

1. A precoding processing method, comprising:
   determining, by a base station, first downlink channel information based on a pilot signal received from a terminal device;
   determining, by the base station, a port to send a reference signal based on the first downlink channel information;
   sending, by the base station, the reference signal to the terminal device using the port that was determined;
   receiving, by the base station, a precoding matrix indication (PMI) from the terminal device based on channel estimation on the reference signal performed by the terminal device;
   determining, by the base station, second downlink channel information based on the PMI;
   determining, by the base station, a precoding matrix of a downlink channel based on the first downlink channel information and the second downlink channel information; and
   performing, by the base station, a precoding processing by using the precoding matrix.

2. The method according to claim 1, wherein determining the precoding matrix of the downlink channel comprises:
   determining, by the base station, a first covariance matrix based on the first downlink channel information;
   determining, by the base station, a second covariance matrix based on the second downlink channel information;
   obtaining, by the base station, a third covariance matrix based on the first covariance matrix and the second covariance matrix, and performing singular value decomposition (SVD) on the third covariance matrix to obtain a first characteristic matrix; and
   determining, by the base station, the precoding matrix of the downlink channel based on the first characteristic matrix and a quantity of downlink transmitted streams.

3. The method according to claim 2, wherein the first covariance matrix is represented as $H_{SRS}{}^H H_{SRS}$, the second covariance matrix is represented as $H_{PMI}{}^H H_{PMI}$, and the third covariance matrix is represented as $R_{HH}$, wherein the third covariance matrix, the first covariance matrix, and the second covariance matrix satisfy:

$$R_{HH} = \alpha H_{SRS}{}^H H_{SRS} + \beta H_{PMI}{}^H H_{PMI},$$

wherein $\alpha$ and $\beta$ represent channel estimation confidence, $H_{SRS}$ represents the first downlink channel information, $H_{SRS}{}^H$ is a matrix obtained through conjugate transposition of $H_{SRS}$, $H_{PMI}$ represents the second downlink channel information, $H_{PMI}{}^H$ is a matrix obtained through conjugate transposition of $H_{PMI}$, the first characteristic matrix is represented as $(U)_{n \times n}$, the precoding matrix is a matrix obtained after m streams are selected from the first characteristic matrix $(U)_{n \times n}$, m is the quantity of downlink transmitted streams, and $m \leq n$.

4. The method according to claim 1, wherein determining the precoding matrix of the downlink channel comprises:
   obtaining, by the base station, third downlink channel information based on the first downlink channel information and the second downlink channel information;

performing, by the base station, singular value decomposition (SVD) on the third downlink channel information to obtain a second characteristic matrix; and obtaining, by the base station, the precoding matrix of the downlink channel after extracting m columns from the second characteristic matrix, wherein m is a quantity of downlink transmitted streams.

5. The method according to claim 1, wherein the reference signal is received by the terminal device using a target port; and the target port is a remaining port in all ports of the terminal device except the port used to send the pilot signal.

6. A precoding processing method, comprising:

receiving, by a base station, a pilot signal from a terminal device;

determining, by the base station, first downlink channel information based on the pilot signal;

determining, by the base station based on the first downlink channel information, a port to use to send a reference signal;

sending, by the base station, the reference signal by using the port that was determined;

receiving, by the base station, a precoding matrix indication (PMI) from the terminal device based on channel estimation on the reference signal performed by the terminal device; and performing, by the base station, precoding processing responsive to receiving the PMI.

7. The method according to claim 6, wherein determining the first downlink channel information based on the pilot signal comprises:

obtaining, by the base station, first uplink channel information based on the pilot signal; and obtaining, by the base station, the first downlink channel information based on the first uplink channel information.

8. The method according to claim 6, further comprising:

determining, by the base station, second downlink channel information based on the PMI;

determining, by the base station, a precoding matrix of a downlink channel based on the first downlink channel information and the second downlink channel information; and performing, by the base station, the precoding processing by using the precoding matrix.

9. The method according to claim 8, wherein determining the precoding matrix of the downlink channel comprises:

determining, by the base station, a first covariance matrix based on the first downlink channel information;

determining, by the base station, a second covariance matrix based on the second downlink channel information;

obtaining, by the base station, a third covariance matrix based on the first covariance matrix and the second covariance matrix, and performing singular value decomposition (SVD) on the third covariance matrix to obtain a first characteristic matrix; and determining, by the base station, the precoding matrix of the downlink channel based on the first characteristic matrix and a quantity of downlink transmitted streams.

10. The method according to claim 9, wherein the first covariance matrix is represented as $H_{SRS}^H H_{SRS}$, the second covariance matrix is represented as $H_{PMI}^H H_{PMI}$, and the third covariance matrix is represented as $R_{HH}$, wherein the third covariance matrix, the first covariance matrix, and the second covariance matrix satisfy:

$$R_{HH} = \alpha H_{SRS}^H H_{SRS} + \beta H_{PMI}^H H_{PMI},$$

wherein α and β represent channel estimation confidence, $H_{SRS}$ represents the first downlink channel information, $H_{SRS}^H$ is a matrix obtained through conjugate transposition of $H_{SRS}$, $H_{PMI}$ represents the second downlink channel information, $H_{PMI}^H$ is a matrix obtained through conjugate transposition of $H_{PMI}$, the first characteristic matrix is represented as $(U)_{n \times n}$, the precoding matrix is a matrix obtained after m streams are selected from the first characteristic matrix $(U)_{n \times n}$, m is a quantity of downlink transmitted streams, and m≤n.

11. The method according to claim 9, wherein determining the precoding matrix of the downlink channel comprises:

obtaining, by the base station, third downlink channel information based on the first downlink channel information and the second downlink channel information;

performing, by the base station, singular value decomposition (SVD) on the third downlink channel information to obtain a second characteristic matrix; and obtaining, by the base station, the precoding matrix of the downlink channel after extracting m columns from the second characteristic matrix, wherein m is the quantity of downlink transmitted streams.

12. The method according to claim 8, wherein the reference signal is received by the terminal device using a target port; and the target port is a remaining port in all ports of the terminal device except the port used to send the pilot signal.

13. A communication apparatus, comprising:

a receiver configured to receive a pilot signal from a terminal device; and a processor configured to:
determine first downlink channel information based on the pilot signal; and
determining a port to send a reference signal based on the first downlink channel information;

a transceiver configured to send the reference signal using the port that was determined;

the receiver is further configured to receive a precoding matrix indication (PMI) from the terminal device based on channel estimation on the reference signal performed by the terminal device; and the processor is further configured to: determine second downlink channel information based on the PMI, determine a precoding matrix of a downlink channel based on the first downlink channel information and the second downlink channel information, and perform precoding processing by using the precoding matrix.

14. The apparatus according to claim 13, wherein the processor is configured to:

determine a first covariance matrix based on the first downlink channel information, and determine a second covariance matrix based on the second downlink channel information;

obtain a third covariance matrix based on the first covariance matrix and the second covariance matrix, and perform singular value decomposition (SVD) on the third covariance matrix to obtain a first characteristic matrix; and determine the precoding matrix of the downlink channel based on the first characteristic matrix and a quantity of downlink transmitted streams.

15. The apparatus according to claim 14, wherein the first covariance matrix is represented as $H_{SRS}^H H_{SRS}$, the second covariance matrix is represented as $H_{PMI}^H H_{PMI}$, and the third covariance matrix is represented as $R_{HH}$, wherein the third covariance matrix, the first covariance matrix, and the second covariance matrix satisfy:

$$R_{HH}=\alpha H_{SRS}{}^H H_{SRS}+\beta H_{PMI}{}^H H_{PMI},$$

wherein $\alpha$ and $\beta$ represent channel estimation confidence, $H_{SRS}$ represents the first downlink channel information, $H_{SRS}{}^H$ is a matrix obtained through conjugate transposition of $H_{SRS}$, $H_{PMI}$ represents the second downlink channel information, $H_{PMI}{}^H$ is a matrix obtained through conjugate transposition of $H_{PMI}$, the first characteristic matrix is represented as $(U)_{n\times n}$, the precoding matrix is a matrix obtained after m streams are selected from the first characteristic matrix $(U)_{n\times n}$, m is the quantity of downlink transmitted streams, and m≤n.

16. The apparatus according to claim 13, wherein the processor is configured to:
  obtain third downlink channel information based on the first downlink channel information and the second downlink channel information,
  perform singular value decomposition (SVD) on the third downlink channel information to obtain a second characteristic matrix, and
  obtain a precoding matrix of the downlink channel after extracting m columns from the second characteristic matrix, wherein m is a quantity of downlink transmitted streams.

17. The apparatus according to claim 13, wherein
  the reference signal is received by the terminal device using a target port; and
  the target port is a remaining port in all ports of the terminal device except the port used to send the pilot signal.

\* \* \* \* \*